United States Patent
Kohno

(10) Patent No.: US 7,448,020 B2
(45) Date of Patent: Nov. 4, 2008

(54) AUTONOMIC COMPUTING SYSTEM, EXECUTION ENVIRONMENT CONTROL METHOD AND PROGRAM

(75) Inventor: Noriaki Kohno, Tokyo-To (JP)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/992,490

(22) Filed: Nov. 18, 2004

(65) Prior Publication Data

US 2005/0125772 A1    Jun. 9, 2005

(30) Foreign Application Priority Data

Dec. 9, 2003    (JP) ............... 2003-410242

(51) Int. Cl.
    *G06F 9/45* (2006.01)
(52) U.S. Cl. .................................. 717/104
(58) Field of Classification Search ................ 717/104
    See application file for complete search history.

(56) References Cited

U.S. PATENT DOCUMENTS 5,995,967 A * 11/1999 Iacobovici et al. .......... 707/100

FOREIGN PATENT DOCUMENTS

JP    PUPA05173769    3/2007

OTHER PUBLICATIONS

An Architechtual Blue Print for Autonomic Computing by IBM Corporation, 17 Skyline Drive, Hawthorne, NY 10532, (URL:http://www-306.ibm.com/autonomic/pdfs/ACwpFinal.pdf).

"IBM perspective (Japanese Document)" by IBM Japan (http://www-6.ibm.com/jp/servers/eserver/ac/view/index.html)   Yusuke Kanehira/Japan/IBM Feb. 2, 2004.

"Software Engineering—Issues and IE Approach", Journal of Japan Industrial Management Association, vol. 38, No. 6B p. B57-B66, Feb. 15, 1988.

* cited by examiner

*Primary Examiner*—John Chavis
(74) *Attorney, Agent, or Firm*—Matthew B. Talpis; Dillon & Yudell LLP

(57) ABSTRACT

An autonomic system and method implements a pattern catalog 20 in which information on execution environments 11 to 14 in the stages of the software life cycle and information on patterns of design applicable in respective the stages of the software life cycle are stored, a pattern combination search engine 30 which searches the patterns with respect to each of the stages in the pattern catalog 20 on the basis of predetermined conditions including a design objective, and a pattern application agent 40 which applies some of the patterns found by searching performed by the pattern combination search engine 30 and controls the operation in the execution environments 11 to 14. Patterns which accord with the design objective are automatically selected to autonomically improve the quality of the piece of software. If a problem is found, an application of patterns obtained by searching performed by the pattern combination search engine 30 is again tried to autonomically solve the problem.

4 Claims, 14 Drawing Sheets

Figure 3

Patterns used in modeling stage
(architecture patterns)

| Pattern | Details |
| --- | --- |
| Layers | A system is divided into layers, in which functions are placed. |
| Pipes and Filters | The functions of a system are divided into processing filters, which are connected by pipes to form a system. |
| Broker | A group of components independent of each other act on each other through a broker. |
| Model-View-Controller | An interactive application is constituted by model, view and controller components. |
| Microkernel | Minimal functions corresponding to a kernel of a system are separated from expansion functions. |

Figure 4

| Name<br>Variable-length character string (50 characters at the maximum) | Purpose<br>Variable-length character string (300 characters at the maximum) | Details<br>Variable-length character string (4000 characters at the maximum) | Adaptability<br>Variable-length character string (1000 characters at the maximum) |
|---|---|---|---|
| Broker | Some kind of interprocess communication is required when distributed components communicate with each other. If the components themselves perform this communication, they depend on a communication mechanism to be subjected to constraints. Therefore, an intermediary is provided to eliminate dependence. | A broker component playing a role as a "broker" is introduced to achieve decoupling of clients and servers. Servers register themselves with the broker, and make their services to clients through method interfaces. Clients access the functionality of servers by sending requests via the broker. Broker tasks include locating the appropriate server, forwarding the request to the server and transmitting results and exceptions from the server back to the client that has made the request. | • There is a need to transparently access from a component to a service offered by a remote component.<br>• It is required that interchange, addition and deletion components be possible even during execution.<br>• There is a need to conceal portions dependent on the system and implementation from users of components and services. |

Figure 5

Patterns used in development stage (design patterns)

| Pattern | Details |
| --- | --- |
| Abstract Factory | A group of classes relating to each other are generated without clarifying the corresponding implementation classes. |
| Builder | With respect to a complex object, an object is generated in a different expression form by the same generation process. |
| Factory Method | Only an interface for generating an object is prescribed, while determination as to which class should be instantiated is entrusted to a subclass. |
| Singleton | It is assured that only one instance exists for one class, and global access to the class is made. |
| Adapter | An interface for one class is converted into another interface. |
| Composite | Objects are composed into tree structures to represent part-whole hierarchies. |
| Decorator | A responsibility is dynamically added to an object. |
| Command | A request is encapsulated as an object to enable passing and queuing of the request. |
| Flyweight | Sharing is used to efficiently support a number of small objects. |
| Observer | All objects dependent on one object are notified of a change in the one object when the change is made. |
| Strategy | A set of algorithms is defined and each algorithm is encapsulated to be made interchangeable. |
| Template Method | The skeleton of an algorithm is defined with respect to one operation and some steps therein are deferred to subclasses. |

Figure 6-1

| Name<br>Variable-length character string (50 characters at the maximum) | Purpose<br>Variable-length character string (300 characters at the maximum) | Details<br>Variable-length character string (4000 characters at the maximum) | Adaptability<br>Variable-length character string (1000 characters at the maximum) |
|---|---|---|---|
| Adapter | To convert the interface of a class into another interface required by a client. An Adapter pattern enables classes with interfaces incompatible with each other to combine with each other. | Sometimes a toolkit class designed for reuse is not reusable only because its interface does not match the domain-specific interface required by an application.<br>Consider for example a drawing editor that lets users draw and arrange graphical elements into pictures and diagrams. The editor handles graphical objects. The interface for graphical objects is defined by an abstract class interface called Shape.<br>TextShape class that can display and edit text is defined as a subclass of Shape. This subclass is considerably more difficult to implement because of a need to implement screen update and so on.<br>Meanwhile, a sophisticated TextView class for displaying and editing text has been provided in some case. In such a case, it is desirable to reuse the TextView class to implement the TextShape class, but an interface mismatch may occur.<br>In such a case, it is possible to define the TextShape class so that the interface of the TextView class is adapted to the interface of the Shape class. This implementation can be achieved by one of the following two methods:<br>(1) a method of inheriting the interface of the Shape class and implementation of the TextView class, and<br>(2) a method of composing a TextView class instance within a TextShape class object and implementing TextShape class by using the interface of the TextView class.<br>The above-described TextShape class is called an adapter. | An Adapter pattern can be used in circumstances described below.<br>• A case where there is a need to use an existing class but its interface does not match the required interface.<br>• A case where there is a need to prepare a reusable class compatible with an irrelevant unexpected class (with a possibility of having an incompatible interface)<br>• A case where there is a need to use a plurality of existing subclasses (only in the case of an Adapter pattern applied to objects) but it is impractical to adapt their interfaces by changing all of the subclasses into sub-subclasses. In the case of an Adapter pattern applied to objects, the interface of the parent class may be adapted. |

Figure 6-2

| Name<br>Variable-length character string<br>(50 characters at the maximum) | Purpose<br>Variable-length character string<br>(300 characters at the maximum) | Details<br>Variable-length character string<br>(4000 characters at the maximum) | Adaptability<br>Variable-length character string<br>(1000 characters at the maximum) |
|---|---|---|---|
| Command | To encapsulate a request as an object in order to parameterize clients with different requests, queue or log requests, and to support undoable operations. | Sometimes it is necessary to issue requests to objects without knowing anything about the operation being requested or the objects receiving the request. For example, user interface toolkits include objects like buttons and menus that carry out a request in response to user input. However, the toolkit cannot implement the request in the button or menu object included in the toolkit.<br>The Command pattern lets objects of the toolkit make requests of unspecified application objects by turning the request itself into an object.<br>A key portion of this pattern is an abstract class Command. An interface such as Execute for performing operation is declared therein. A concrete subclass of the Command implements an Execute operation invoking requests, but the requester is not conscious of which concrete subclass is used. | A Command pattern can be used in cases described below.<br>• A case where there is a need to parameterize objects by an executing operation such as menu selection.<br>• A case where there is a need to independently perform explication, ordering and execution of requests.<br>• A case where there is a need to support undoing of requests.<br>• A case where there is a need to support update of a log for reexecution of commands after the system has crushed.<br>• A case where there is a need to structure the system by high-level operations made on the basis of primitive operations. |

Figure 7

Patterns used in testing stage

| Pattern | Details |
| --- | --- |
| TestBoundaryConditions | Boundary conditions are tested. |
| TestNull | Test is made by delivering a null value as a parameter. |
| RandomTesting | Test is executed by giving random values. |
| MockObject | Test is made by giving, as objects to be further called by a testing target, objects the operations of which are determined in advance for testing. |

Figure 8

Patterns used in testing stage

| Pattern | Details |
| --- | --- |
| Stand-Alone Single Channel Application Pattern | An independent server offers a service to a single kind of user. |
| Directly Integrated Single Channel Application Pattern | A conventional system and a new system are directly connected to offer a service to a single kind of user. |
| Router Application Pattern | A conventional system and a new system are connected via a router system to offer a service to a user. |
| Decomposition Application Pattern | A request from a user is decomposed into a plurality of pack ends to perform processing. |
| Agent Application Pattern | An agent interactive with a user is prepared, the agent invoking actual processing. |

Figure 9

| Name<br>Variable-length character string (50 characters at the maximum) | Purpose<br>Variable-length character string (300 characters at the maximum) | Details<br>Variable-length character string (4000 characters at the maximum) | Adaptability<br>Variable-length character string (1000 characters at the maximum) |
|---|---|---|---|
| Decomposition Application Pattern | To decompose one composite request issued from a client into a plurality of simple requests and intelligently route the requests to a plurality of backend applications in order to provide client-centered integrated information display. | This application pattern is formed of three logical layers: presentation, decomposition, and backend application layers.<br>The presentation layer supports various presentation styles such as the Internet, a call center, a kiosk, and a speech recognition device.<br>The decomposition layer supports almost all of services such as intelligent routing of requests, protocol conversion, security, and session collection provided by the router layer of a "Router" application pattern. Further, the decomposition layer implements intelligence to decompose one presentation client request into a plurality of simple requests and route the requests to a plurality of backend applications.<br>Many of business logics specific to products and functions are centered on the backend application layer. Such backend applications include on-line transaction systems and batch applications having high usability and extensibility. | The structure of a "Router" application pattern is suitable for an application which needs intelligent routing from a plurality of delivery channels to one application in a plurality of backend applications and meets business requirements and IT requirements:<br>· to reduce business event wait time,<br>· to ensure easy adjustment to mergers and acquisitions,<br>· to combine a plurality of delivery channels,<br>· to minimize TCO (total cost of ownership),<br>· to effectively utilize current skills,<br>· to effectively utilize existing systems<br>· to integrate background applications<br>· to reduce the complexity of businesses<br>· to ensure maintenance facility, and<br>· to ensure expansion facility. |

Figure 10

| Combination of patterns | Weight value |
|---|---|
| Abstract Factory-Singleton | 0.5 |
| Abstract Factory-Factory Method | 0.8 |
| Composite-Builder | 0.5 |
| Composite-Decorator | 0.3 |
| Decorator-Strategy | -0.7 |
| Strategy-Template Method | 0.7 |

Figure 11

| Combination of patterns | Weight value |
|---|---|
| Modeling stage-development stage | |
| Broker-Adapter | 0.8 |
| Broker-Command | 0.5 |
| MVC-Observer | 0.8 |
| Development stage-testing stage | |
| Adapter-MockObject | 0.5 |
| Observer-Random Testing | 0.3 |
| Modeling stage-operation stage | |
| MVC- Stand-Alone Single Channel | 0.3 |
| Broker-Decomposition | 0.8 |
| Development stage-operation stage | |
| Command-Decomposition | 0.7 |
| Command-Agent | 0.7 |

Figure 12

| Stage of software life cycle | Applicable pattern |
|---|---|
| Modeling stage | Broker |
| Development stage | Adapter (Broker-Adapter: 0.8)<br>Command (Broker-Command: 0.5) |
| Testing stage | MockObject (Adapter-MockObject: 0.5) |
| Operation stage | Decomposition (Broker-Decomposition: 0.8) |

AUTONOMIC COMPUTING SYSTEM, EXECUTION ENVIRONMENT CONTROL METHOD AND PROGRAM

FIELD OF THE INVENTION

The present invention relates to autonomic computing and, more particularly, to autonomic computing applied to software development operations.

BACKGROUND OF THE INVENTION

Today, computers are used in various situations. Correspondingly, computer systems are becoming increasingly complicated. In view of this, the concept of autonomic computing has been proposed in which a computer has the functions of accommodating itself to various circumstances and making decisions by itself to adapt itself to a changing environment (selfconfiguration), to find/diagnose/prevent (selfrepair) faults, to adjust resources and loads (selfoptimization), and predict/detect/identify/protect against attacks (selfguard) (see, for example, non-patent documents 1 and 2).

Autonomic computing is presently being developed with the aim of enabling a computer system to operate autonomically in an optimum condition at the time of execution of a task, and application of autonomic computing to software development operations has not been conceived. Among operations relating to a computer system, however, those for development and maintenance of software require the heaviest workload.

Today, many developers at various skill levels take part in a software development venture. In many cases of such software development, therefore, quality problems come to the surface, including a problem that the quality of a code is not stable, a problem that bugs exist at the time of execution of an actual task or in the final stage of a test before execution of a task, and a problem that the performance is poor. In a case where a problem comes out in such a stage, operations such as problem determination and embedding of performance measurement codes, design modification, bug fixing and retesting are performed by going back to modeling, development, testing and operation stages upstream in the software development flow. Thus, a large workload is imposed.

It is, therefore, effective to enable a computer to autonomically adapt itself to various circumstances which occur in different stages (phases) of software development.

SUMMARY OF THE INVENTION

A considerably large workload is required for development of software for a computer system, as described above. It is, therefore, preferable to enable a computer to perform autonomic adaptation by itself in operations in the corresponding stage. In conventional autonomic computing, however, operations to be performed by a computer system are autonomic operations at the time of execution of a task. Autonomic computing has not been applied to software development operations.

Conventionally, various software tools (hereinafter referred to simply as tools) are used in the phases of the above-described software development as a means for improving quality and productivity in the software development. For example, modeling is performed by using a modeling tool; a code is automatically generated from the results of modeling by using a development support tool; tests are executed by using automatic testing tools such as LoadRunner (a load test tool from Mercury Interactive Corporation) and JUnit (a testing framework for the Java® (trademark of Sun Microsystems, Inc.) language), and a code quality check is made by using JTest (a unit test tool from Parasoft Corporation).

However, these existing tools are tools for supporting various operations in the phases of software development, i.e., tools actively used by a developer for assistance to developer's operations.

In the field of software development, no mechanism effective in improving the quality of software in an autonomic computing manner exists at present.

Typically, a problem concerning software is related to some of operations in the stages of the software life cycle (modeling, development, testing, operation). For example, poor modeling results in a performance problem in the operation stage. In autonomic adaptation to problems concerning software, therefore, it is effective to provide a device for facilitating autonomic solution throughout the life cycle of the software.

Therefore, an object of the present invention is to implement an autonomic system and method for improving the quality of software with respect to operations in stages of the software life cycle including a modeling stage, a development stage, a testing stage and an operation stage.

Another object of the present invention is to implement a system and method for autonomic solution throughout the software life cycle.

To achieve the above-described objects, the present invention is implemented as an autonomic computing system arranged as described below. That is, this system has execution environments in which operations in stages of a software life cycle including a modeling stage, a development stage, a testing stage and an operation stage are executed, a pattern catalog in which information on patterns of design applicable in respective the stages of the software life cycle is stored, a pattern search section which searches the patterns with respect to each of the stages of the software life cycle in the pattern catalog on the basis of a predetermined condition, and a pattern application section which applies to each of the stages of the software life cycle some of the patterns as a result of searching performed by the pattern search section, and controls the operation in the execution environment in the stage.

To be more specific, the pattern catalog stores a weight value indicating the degree of relationship in combinations of a plurality of the patterns as information on the patterns, and the pattern search section searches the patterns on the basis of the weight value. The weight value is set not only for combinations of patterns used in one of the stages of the software life cycle but also for a combination of the patterns in different ones of the stages.

More preferably, the pattern application section performs, with respect to the pattern applicable to a predetermined one of the stages of the software life cycle, a simulation of operations in the stages subsequent to the predetermined one of the stages, and determines the pattern to be applied to the predetermined one of the stages on the basis of the results of the simulation.

Further, when a problem is found in the processed software in a predetermined one of the stages of the software life cycle and the pattern application section receives a report on the problem from the execution environment in the stage, the pattern application section goes back to a preceding one of the stages before the predetermined one of the stages and newly applies another of the patterns different from the pattern that has been applied to the preceding stage, and controls the operation in the execution environments in the stages subsequent to the preceding stage.

To achieve the above-described objects in another aspect of the present invention, the present invention is implemented as an execution environment control method of controlling the operation of an execution environment in each of stages of a software life cycle including a modeling stage, a development stage, a testing stage and an operation stage by using a computer, as described below. This execution environment control method includes a step of searching, on the basis of a predetermined condition, a pattern catalog which is constructed in a predetermined storage means and in which information on patterns of design applicable in respective the stages of the software life cycle is stored to find a pattern applied to each of the stages of the software life cycle, and a step of applying the pattern found by searching to each of the stages of the software life cycle and controlling the operation in the execution environment in the stage.

Further, the present invention is implemented as a program for controlling a computer so that the computer functions as the above-described autonomic computing system, or a program for executing processings corresponding to the steps of the above-described execution environment control method. This program can be distributed by being stored on a magnetic disk, an optical disk, a semiconductor memory or any other storage medium, or by being transmitted via a network.

According to the present invention arranged as described above, a search according to a desired design purpose is made on prepared design patterns, and the operation in the execution environment in each stage is controlled on the basis of a pattern obtained by the search, thus implementing an autonomic system and method capable of improving the quality of software through the entire software life cycle.

According to the present invention, the autonomic computing system of an embodiment provides a system and method in which, to select a design pattern to be applied in each stage of the software life cycle, a simulation of operations in the subsequent stages is performed to predict occurrence of a problem, and in which, when a problem occurs actually in a predetermined one of the stages, the application of the design pattern is changed by going back to a predetermined one of the stages, thus autonomically solving a problem.

BRIEF DESCRIPTION OF THE DRAWINGS

FIG. 3 is a diagram showing an example of design patterns used in the modeling stage of the software life cycle;

FIG. 4 is a diagram showing an example of information about the Broker stored in a pattern catalog;

FIG. 5 is a diagram showing an example of design patterns used in the development stage of the software life cycle;

FIG. 6-1 is a diagram showing an example of information about the Adapter stored in the pattern catalog;

FIG. 6-2 is a diagram showing an example of information about the Command stored in the pattern catalog;

FIG. 7 is a diagram showing an example of design patterns used in the testing stage of the software life cycle;

FIG. 8 is a diagram showing an example of design patterns used in the operation stage of the software life cycle;

FIG. 9 is a diagram showing an example of information about the Decomposition Application Pattern stored in the pattern catalog;

FIG. 10 is a diagram showing the relationship between combinations of patterns and weight values assigned to the combinations with respect to an example of design patterns used in the development stage;

FIG. 11 is a diagram showing the relationship between combinations of patterns used in different stages and weight values assigned to the combinations;

FIG. 12 is a diagram showing an example of a pattern list used in the embodiment;

DETAILED DESCRIPTION

A best mode for carrying out the present invention (hereinafter referred to as "embodiment") will be described in detail with reference to the drawings.

The outline of the present invention will first be described. A method of preparing patterns of good design and selecting and using some of the patterns is being widely used as a means for improving the quality in each of software development stages. According to the present invention, a software life cycle is grasped as four stages: a modeling stage, a development stage, a testing stage and an operation stage, applicable patterns are collected with respect to each of the stages; a suitable one of the patterns is selected with respect to each stage; a suitable combination of the patterns with respect to the stages is selected by considering the entire software life cycle; and operations in each stage of the software life cycle are autonomically executed according to the selected pattern.

The modeling stage of the software life cycle is a stage in which operations for constructing, as a network data structure representing program modules and the connection relationship between the modules, a logical model of a piece of software to be developed, and storing the logical model in a storage device of a computer are performed.

The development stage is a stage in which operations for generating a program code for actually controlling and realizing the operation of the computer on the basis of a software logical model formed in the modeling stage, and storing the program code in the storage device of computer are performed.

The testing stage is a stage in which actual measurements of, for example, the times required for detection of bugs and processing are carried out by executing, with the computer, under various testing conditions, a program code generated in the development stage.

The operation stage is a stage in which a task is executed by installing a program code which has passed tests in the storage device of the computer in the system for actually carrying out tasks.

Figure 1:
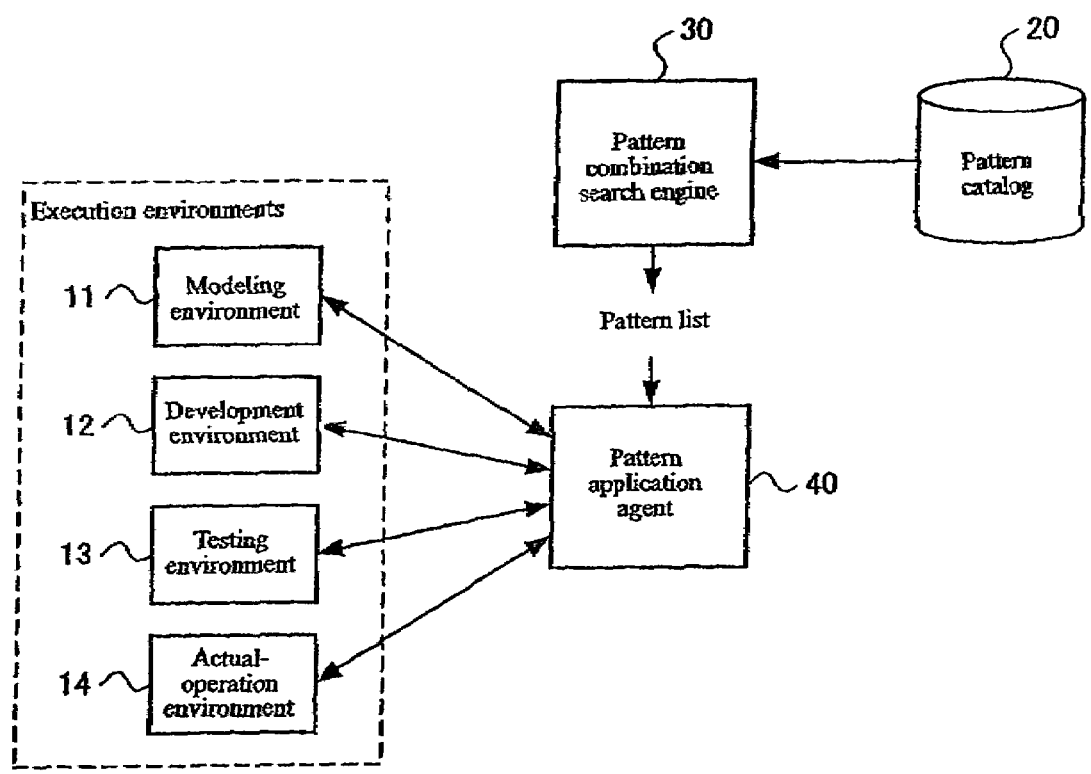
FIG. 1 is a diagram showing the entire configuration of an autonomic computing system in accordance with the embodiment.

FIG. 1 is a diagram showing the entire configuration of an autonomic computing system in accordance with this embodiment.

Referring to FIG. 1, the autonomic computing system of this embodiment has execution environments (modeling environment 11, development environment 12, testing environment 13 and actual-operation environment 14) which are means for executing operations in each of stages of a software life cycle (modeling, development, testing, operation), a pattern catalog 20 in which patterns related to each stage are stored, a pattern combination search engine 30 which selects and combines some of the patterns stored in the pattern catalog 20, and a pattern application agent 40 which applies patterns to execution environments 11 to 14.

These functions may be physically implemented by means of a single computer unit or a plurality of computer units. For example, a configuration may be adopted in which one computer is provided for the pattern catalog 20, the pattern combination search engine 30 and the pattern application agent 40, and another computer is provided for the execution environments 11 to 14. Alternatively, a configuration in which one computer is provided for the pattern catalog 20 and the pattern combination search engine 30 and another computer is provided for the pattern application agent 40 and the execution environments 11 to 14, or a configuration in which one computer is provided for the pattern catalog 20, the pattern combination search engine 30, the pattern application agent 40 and the execution environments 11 to 13 and another computer is provided for the actual-operation environment 14 may be adopted.

Figure 2:
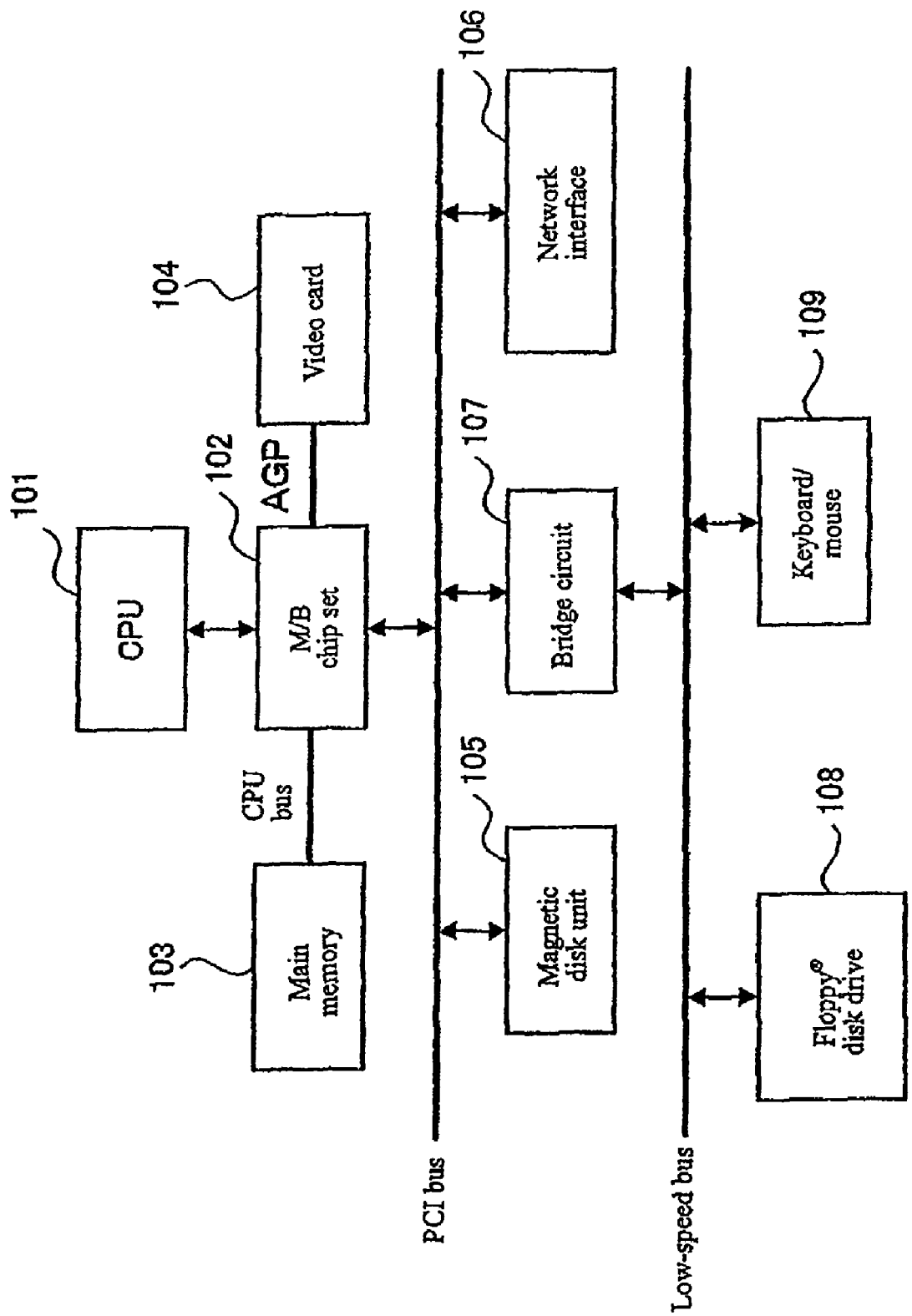
FIG. 2 is a diagram schematically showing an example of a hardware configuration of a computer unit suitable for implementation of the autonomic computing system in accordance with the embodiment.

FIG. 2 is a diagram schematically showing an example of a hardware configuration of a computer unit suitable for implementation of the autonomic computing system in accordance with this embodiment.

The computer unit shown in FIG. 2 has a CPU (central processing unit) 101, which is a computation means, a main memory 103 connected to the CPU 101 via an M/B (motherboard) chip set 102 and a CPU bus, a video card 104 also connected to the CPU 101 via the M/B chip set 102 and an AGP (Accelerated Graphics Port), a magnetic disk unit (HDD) 105 and a network interface 106 connected to the M/B chip set 102 via a PCI (Peripheral Component Interconnect) bus, and a floppy (trademark) disk drive 108 and a keyboard/mouse 109 connected to the M/B chip set 102 via the PCI bus, a bridge circuit 107 and a low-speed bus such as an ISA (Industry Standard Architecture) bus.

FIG. 2 shows only an example of a hardware configuration of a computer unit for implementation of this embodiment. Other various configurations may be adopted if this embodiment can be applied to them. For example, a configuration may be adopted such that a video memory is provided while the video card 104 is removed, and image data is processed by the CPU 101. Also, a CD-R (compact disc recordable) drive or a DVD-RAM (digital versatile disc random access memory) drive may be provided as an external storage device by being connected via an ATA (AT attachment) interface or SCSI (small computer system interface).

In the configuration of the autonomic computing system shown in FIG. 1, the pattern catalog 20 is, for example, a database which is implemented in a state of being stored in the magnetic disk unit 105 shown in FIG. 2, and in which information about design patterns in the stages of the software life cycle is stored.

As information about the patterns, values for weighting (hereinafter referred to as "weight value") representing the relationships between the patterns are stored as well as names, purposes, details and applicability of the patterns are registered. As a purpose of each pattern, information as to what will be done with the pattern, what are the principle and meaning of the pattern and what are a design theme and a problem which can be pursued with the pattern is described. As details of a pattern, a description is made as to how a problem is solved with the pattern. As applicability of a pattern, a description is made as to in what circumstances the pattern is applicable.

Each of these sorts of information about patterns is recorded in a text formed of a variable length character string.

In a predetermined operation, combined use of some of the patterns provided for use in this embodiment is effective, and combined use of some other of the patterns is undesirable or inhibited. For example, a pattern "Strategy" and a pattern "Template Method", described below in detail, exist as design patterns used in the modeling stage. It is possible to determine a calling form by the Template Method and to determine processing details by Strategy. Therefore, combined use of these patterns is effective. As a method of changing an object by using a design pattern, a means of changing the mold of the object by using a pattern "Decorator" or a means of changing the contents of the object by Strategy can be used. In this case, it is useless to simultaneously change the mold and the contents. Therefore, one of these patterns are exclusively selected and used.

In the pattern catalog 20, therefore, combinations of patterns are weighted to enable predetermined patterns which can be effectively used in combination, predetermined patterns the combined use of which is undesirable, and predetermined patterns which cannot be used in combination to be identified on the basis of their weight values at the time of selection from the patterns. In this embodiment, patterns which can be effectively used in combination are assigned a positive weight value according to the degree of effectiveness. Conversely, patterns the combined use of which is undesirable or inhibited are assigned a negative weight value according to the degree of inhibition. For example, the combination of the above-mentioned design patterns Strategy and Template method is assigned a positive weight value, while the combination of Decorator and Strategy is assigned a negative weight value.

This weighting is performed not only on the relationships between patterns in each stage of the software life cycle but also on the relationships between patterns used in two or more of the stages. That is, a relationship such that if a pattern A is used in the modeling stage, use of a pattern B in the development stage is effective or a pattern C cannot be used can be expressed by a weight value.

The pattern combination search engine 30 is implemented, for example, by means of the program-controlled CPU 101 of the computer unit shown in FIG. 2. The pattern combination search engine 30 searches for a pattern to be used in each stage of the software life cycle on the basis of the information about the patterns stored in the pattern catalog 20.

More specifically, a user of the system (software developer) determines a desired one of the stages of the software life cycle and inputs a pattern use purpose as a design target. The pattern combination search engine 30 accepts this input, searches for patterns matching the input use purpose by referring to the pattern information registered in the pattern catalog 20, and finds patterns the combined use of which is effective on the basis of the weight values of the pattern combinations registered in the pattern catalog 20.

Further, the pattern combination search engine 30 searches the patterns with respect to each of the stages of the software lifecycle in the same way, examines combinations of patterns the combined use of which is effective on the basis of the weight values of the combinations of patterns with respect to two or more of the stages, and thereby forms a pattern list. In the pattern list, combinations of patterns considered to be highest in effectiveness (i.e., those having the largest sums of the weight values in the combinations of patterns) may be listed or several combinations of patterns in decreasing order of effectiveness may be listed. The formed pattern list is saved to a storage device, e.g., the main memory 103 or the magnetic disk unit 105 shown in FIG. 2 to be used in control performed by the pattern application agent 40 as described below.

The pattern application agent 40 is implemented, for example, by means of the program-controlled CPU 101 of the computer unit shown in FIG. 2. The pattern application agent 40 performs operation control by calling up and automatically executing callable tools in each of the execution environments 11 to 14 in the stages of the software life cycle on the basis of the pattern list formed by the pattern combination search engine 30. For example, the pattern application agent 40 calls up an automatic code generation tool in the development stage and controls the development environment 12 so that code generation in accordance with a design pattern in the pattern list is performed. Also, the pattern application agent 40 calls up an automatic testing tool such as JUnit in the testing stage and controls the testing environment 13 so that a testing program in accordance with a pattern in the pattern list is automatically executed. Also, the pattern application agent 40 calls up a code placement tool in the operation stage and controls the actual-operation environment 14 so that an application server or the like performs application code placement in accordance with a pattern in the pattern list.

If a plurality of combinations of patterns are listed in the pattern list, each of the execution environments 11 to 14 may be controlled in accordance with the combination of patterns having the largest sum of weight values, or the pattern list may be output to urge the user to select from the pattern list and each of the execution environments 11 to 14 may be controlled in accordance with the combination selected by the user. That is, in this case, the pattern application agent also functions as a pattern determination means for determining from the pattern list a pattern to be actually used in each stage of the software life cycle.

Description will be made of patterns for use in each stage.

Patterns usable in the modeling stage of the software life cycle are generally known as architecture patterns.

FIG. 3 shows typical examples of such patterns: "Layers", which allows a system to be divided into layers, in which functions are placed; "Pipes and Filters", which allows the functions of a system to be divided into processing filters, which are connected by pipes to form a system; "Broker", which allows a group of components independent of each other to act on each other through a broker; "Model-View-Controller (MVC)", which allows an interactive application to be constituted by model, view and controller components; and "Microkernel", which allows minimal functions corresponding to a kernel of a system to be separated from expansion functions.

In the pattern catalog 20, information about these patterns in the modeling stage is stored.

FIG. 4 is a diagram showing an example of information stored in the pattern catalog 20 about the above-described Broker. For the Broker, which is a pattern in the modeling stage, texts in which a purpose, details and applicability are described are recorded along with a name, as shown in FIG. 4.

Patterns usable in the development stage are generally known as design patterns. FIG. 5 shows typical examples of such patterns: "Abstract Factory", which allows a group of classes relating to each other to be generated without clarifying the corresponding implementation classes; "Builder", which allows, with respect to a complex object, an object to be generated in a different expression form by the same generation process; "Factory Method", which allows only an interface for generating an object to be prescribed, while determination as to which class should be instantiated is entrusted to a subclass; "Singleton", which assures that only one instance exists for one class, and allows global access to the class; "Adapter", which allows an interface for one class to be converted into another interface; "Composite", which allows objects to be composed into tree structures to represent part-whole hierarchies; "Decorator", which allows a responsibility to be dynamically added to an object; "Command", which allows a request to be encapsulated as an object to enable passing and queuing of the request; "Flyweight", which uses sharing to efficiently support a number of small objects; "Observer", which allows all objects dependent on one object to be notified of a change in the one object when the change is made; "Strategy", which defines a set of algorithms and allows each algorithm to be encapsulated to be made interchangeable; and "Template Method", which defines the skeleton of an algorithm with respect to one operation and defers some steps therein to subclasses.

In the pattern catalog 20, information about these patterns in the development stage is stored.

FIGS. 6-1 and 6-2 are diagrams showing an example of information stored in the pattern catalog 20 about the above-described Adapter and Command. For each of Adapter and Command, which are patterns in the development stage, texts in which a purpose, details and applicability are described are recorded along with a name, as shown in FIG. 6-1 or 6-2.

As patterns usable in the testing stage, testing patterns made public on a Web site (http://c2.com/cgi-bin/wiki?TestingPatterns) on the Internet for example exist, although they are not generally recognized like the design patterns in the development stage. These testing patterns can be used. The testing patterns made public on the Web site include those shown in FIG. 7: "TestBoundaryConditions" for testing boundary conditions between modules; "TestNull", which is executed by delivering a null value as a parameter; "RandomTesting", which is executed by giving random values; and "MockObject", which is a further object called by a tested subject and is executed by giving objects the operations of which are determined in advance for testing. Other testing methods, e.g., a stress test as to whether or not a problem occurs when a load is imposed on a system, and a long-run test as to whether or not a problem occurs when a system operates for a long time.

Patterns usable in the operation stage to actually construct a system are patterns of topology of configurations in hardware or software. As such patterns, patterns made public on a Web site (http://www-106.ibm.com/developworks/patterns/ja_jp/) on the Internet for example exist, although they are not generally recognized like the design patterns in the development stage. These patterns can be used. The patterns made public on the Web site include those shown in FIG. 8: "Stand-Alone Single Channel Application Pattern", which allows an independent server to offer a service to a single kind of user; "Directly Integrated Single Channel Application Pattern", which allows a conventional system and a new system to be directly connected to offer a service to a single kind of user; "Router Application Pattern", which allows a conventional system and a new system to be connected via a router to offer a service to a user; "Decomposition Application Pattern", which allows a request from a user is decomposed into a plurality of pack ends to perform processing; and "Agent Application Pattern", which allows an agent interactive with a user to be prepared, the agent invoking actual processing.

In the pattern catalog 20, information about these patterns in the operation stage is stored.

FIG. 9 is a diagram showing an example of information stored in the pattern catalog 20 about the above-described Decomposition Application Pattern. For the Decomposition Application Pattern, which is a pattern in the operation stage, texts in which a purpose, details and applicability are described are recorded along with a name, as shown in FIG. 9.

Needless to say, these patterns used in the stages of the software life cycle are only an example, and other known patterns and various patterns empirically obtained by actual software development may be utilized by being registered in the pattern catalog 20.

Weighting among patterns will next be described.

FIG. 10 is a diagram showing the relationship between combinations of patterns and weight values assigned to the combinations with respect to an example of design patterns used in the development stage.

In the example shown in FIG. 10, weight values are set on a scale of 0 to 20 such that a weight value of 1 indicates a combination of patterns which should be simultaneously used on all occasions, a weight value of 0 indicates a combination of patterns not linked with each other, and a weight value of −1 indicates a combination of patterns which must not be used simultaneously.

Referring to FIG. 10, a weight value of 0.5 is assigned to the combination of the Abstract Factory and the Singleton. One implementation factory corresponding to the Abstract Factory may suffice according to implementation, and a factory is ordinarily prepared as the Singleton to avoid waste. However, these two are not mutually exclusive. Therefore, setting to a medium value, 0.5, is made.

A weight value of 0.8 is assigned to the combination of the Abstract Factory and the Factory Method. The Factory Method is a method suitable for implementation of the Abstract Factory and it is used in combination with the same in ordinary cases. Therefore, setting to a higher value, 0.8, is made to enable one of the Abstract Factory and the Factory Method to be selected easily when the other is selected.

A weight value of 0.5 is assigned to the combination of the Composite and the Builder. Programming for constructing the Composite is ordinarily complicated. It is, therefore, convenient to provide the Builder for construction. However, programming can be performed even when the Builder is not provided, and the Composite and the Builder are not mutually exclusive. Therefore, setting to a medium value, 0.5, is made.

A weight value of 0.3 is assigned to the combination of the Composite and the Decorator. The Decorator can be regarded as a degenerate Composite. Use of one of them may suffice and it is not necessary to provide the both of them. Therefore, setting to a smaller value, 0.3, is made.

A weight value of −0.7 is assigned to the combination of the Decorator and the Strategy. With respect to this combination, a means of changing the mold by the Decorator or a means of changing the contents by the Strategy is exclusively used as a method of changing objects, as already described above. Therefore, setting to a negative value is made to inhibit selection of one of the Decorator and the Strategy when the other is selected.

A weight value of 0.7 is assigned to the combination of the Strategy and the Template Method. A calling form can be determined by the Template Method and processing details can be determined by the Strategy. It is effective to use the Strategy and the Template Method in combination. Therefore, setting to a higher value, 0.7, is made to enable one of the Strategy and the Template Method to be selected easily when the other is selected.

FIG. 11 is a diagram showing the relationship between combinations of patterns used in different stages and weight values assigned to the combinations.

In the example shown in FIG. 11, weight values are also set on a scale of 0 to 20 in the same manner as in the example shown in FIG. 10, a weight value of 1 indicating a combination of patterns which should be simultaneously used on all occasions, a weight value of 0 indicating a combination of patterns not linked with each other, a weight value of −1 indicating a combination of patterns which must not be used simultaneously.

Referring to FIG. 11, a weight value of 0.8 is assigned to the combination of the Broker and the Adapter in the combinations of patterns in the modeling stage and patterns in the development stage. In a case where connection is established between a client and various servers by the Broker, the differences between the calling forms of the servers are absorbed by the Adapter to facilitate connection. Therefore, setting to a higher value, 0.8, is made to ensure that the Adapter can be easily selected in the development stage in a case where the Broker is selected in the modeling stage.

A weight value of 0.5 is assigned to the combination of the Broker and the Command. In a case where a request is passed by the broker, implementation is facilitated if request handling is centralized. This combination, however, is not as effective as the combination of the Broker and the Adapter. Therefore, setting to a medium value, 0.5, is made.

A weight value of 0.8 is assigned to the combination of the MVC and the Observer. In the MVC, it is necessary for the view to change with a change of the model. This change can ordinarily be made by using the Observer. Therefore, setting to a higher value, 0.8, is made to ensure that the Observer can be easily selected in the development stage in a case where the MVC is selected in the modeling stage.

A weight value of 0.5 is assigned to the combination of the Adapter and the MockObject in the combinations of patterns in the development stage and patterns in the testing stage. In Adapter testing, a method of testing the functions of the Adapter by making the MockObject of an Adapter conversion original is effective. However, the testing stage is implemented with a comparatively high degree of freedom as to which kind of test should be carried out or whether or not testing itself should be executed, in contrast with the other stages. Determination as to which kind of test should be carried out or whether or not testing itself should be executed depends largely on a software developer's will. Therefore, setting to a medium value, 0.5, is made, although the combination of the Adapter and the MockObject is effective.

A weight value of 0.3 is assigned to the combination of the Observer and Random Testing. In checking whether or not the Observer is functioning correctly, a method of checking the operation of the Observer by randomly changing a subject observed by the Observer. However, since this weighting is weighting relating to pattern selection in the testing stage, setting to a smaller weight value is made.

A weight value of 0.3 is assigned to the combination of the MVC and the Stand-Alone Single Channel in the combinations of patterns in the modeling stage and patterns in the operation stage. The MVC can be used in a single-machine system. However, a form is also effective in which the view is placed on a client and the model and the controller placed on a server. The combination of the MVC and the Stand-Alone Single Channel is not particularly effective. Therefore, setting to a smaller value, 0.3, is made.

A weight value of 0.8 is assigned to the combination of the Broker and the Decomposition. The Broker function is placed on an intermediate server to implement the Decomposition pattern. Therefore, setting to a higher value, 0.8, is made to ensure that the Decomposition can be easily selected in the operation stage in a case where the Broker is selected in the modeling stage.

A weight value of 0.7 is assigned to the combination of the Command and the Decomposition in the combinations of patterns in the development stage and patterns in the operation stage for system construction. In a case where a process is decomposed to be performed by a plurality of servers, it is effective to handle a processing request by the Command. Therefore, setting to a higher value, 0.7, is made to ensure that the Decomposition can be easily selected in the operation stage in a case where the Command is selected in the development stage.

A weight value of 0.7 is assigned to the combination of the Command and the Agent. In a case where the Agent is used, a mode of implementation in which a processing request is handled by the Command and the Agent finds a suitable processing place and hands over the Command. Therefore, setting to a higher value, 0.7, is made to ensure that the Agent can be easily selected in the operation stage in a case where the Command is selected in the development stage.

As described above, in either combinations of patterns in each stage of the software life cycle or combinations of patterns used in different ones of the stages, a higher weight value is assigned to a combination of patterns capable of obtaining a high effect when used together, while a lower weight value is assigned to a combination of patterns not capable of obtaining a substantially high effect. Also, a negative weight value is assigned to a combination of patterns to be used mutually exclusively. Concrete weight values for this weighting are set on the basis of experience in software development.

The values shown in FIGS. 10 and 11 are only an example. Also, weight value setting based on actual systems may be made in such a manner that patterns used in each stage in successful systems is examined to extract combinations of patterns used together and the frequencies of the patterns are analyzed and fed back.

Description will next be made of the pattern list formed by the pattern combination search engine 30.

As described above, the pattern combination search engine 30 first finds a pattern (1) matching a design target (pattern use purpose) input by a system user (software developer) and enters the pattern (1) in the pattern list. The pattern combination search engine 30 then searches a pattern (2) having a high degree of relationship (having a high weight value) by considering the above-described weight values among patterns in the same stage of the software life cycle as the pattern (1) and enters the pattern (2) in the pattern list. In the case of selecting patterns (2) related to the pattern (1) on the basis of the weight value, the number of patterns (2) can be limited by setting a threshold value (for example, only patterns having a weight value of 0.1 or higher in combination with the pattern (1) are found and entered in the pattern list). Also, not only selection of a pattern having a high weight value in combination with the pattern (1) but also another pattern having a high weight value in combination with a selected pattern (2) can be made.

More specifically, for example, the Composite is selected as pattern (1) in the case of searching patterns in the development stage, and the Flyweight having a high weight value in combination with the Composite is found as pattern (2). Further, if the weight value of the combination of the Flyweight and the Strategy is high, the Strategy is also found as pattern (2) related to the Composite. However, to avoid limitlessly tracing the relationships between patterns in this case, the weight value of the combination of the Composite and the Flyweight and the weight value of the combination of the Flyweight and the Strategy are multiplied and the Strategy is obtained as pattern (2) only when the result of this multiplication exceeds the above-mentioned threshold value.

When the pattern (2) found on the basis of the weight value is to be entered, the weight value of the combination of the pattern (2) and a pattern (x) found on the basis of a use purpose input in another of the stages of the software life cycle is also considered. More specifically, a method including this consideration is such that, for example, when one pattern (2) is to be entered in the pattern list, the weight value of the combination of the pattern (2) and the pattern (1) in the same stage and the weight value of the combination of the pattern (2) and the pattern (x) in another stage are added together and the evaluation of the pattern (2) in the pattern list is performed by using the value obtained as the result of this addition. In a case where a plurality of patterns (2) having the same weight value in one of the stages of the software life cycle are found, and where the weight value of the combination of one of the patterns (2) and a pattern (x) in another of the stages of the software life cycle and the weight value of the other of the patterns (2) and the pattern (x) are different from each other, the pattern (2) in the combination with the pattern (x) having the higher weight value is recognized as more effective at the time of entry in the pattern list.

When the user of the system inputs a pattern use purpose as a design target, he or she can set an importance value indicating the importance of the design target and also input the importance value. In this case, an evaluation value is obtained by multiplying together the above-described addition value of the weight value of the pattern (2) found by the pattern combination search engine 30 and the set importance value, and the evaluation of the pattern (2) in the pattern list is thereby performed. In this manner, the system user can designate the degree of importance of each of design targets when setting the design target to enable the system to finely meet the system user's demand.

FIG. 12 is a diagram showing an example of the pattern list.

As shown in FIG. 12, patterns to be used in the modeling stage, the development stage, the testing stage and the operation stage of the software life cycle are listed in the pattern list used in this embodiment. As described above, the pattern application agent 40 performs operation control with respect to execution environments 11 to 14 in the stages on the basis this pattern list. In the pattern list shown in FIG. 12, the weight value of the combination of one pattern in one of the stages with a pattern in another of the stages is shown. It can be understood that, for example, the Adapter pattern in the development stage and the Decomposition pattern in the operation stage are selected because they have a high effect (high weight value) when used in combination with the Broker in the modeling stage. Also, the weight values of the combinations of each pattern with the other patterns in the same stage and evaluation values obtained by multiplying addition values of these weight values by an importance value are referred to for selection from the pattern list, as described above. The weight values of the combinations of patterns are referred to when the patterns entered in the pattern list by the pattern combination search engine 30 are searched, and it is not necessarily required that the weight values be shown in the pattern list.

Description will now be made of autonomic operations relating to software development using the autonomic computing system arranged as described above.

Figure 13:
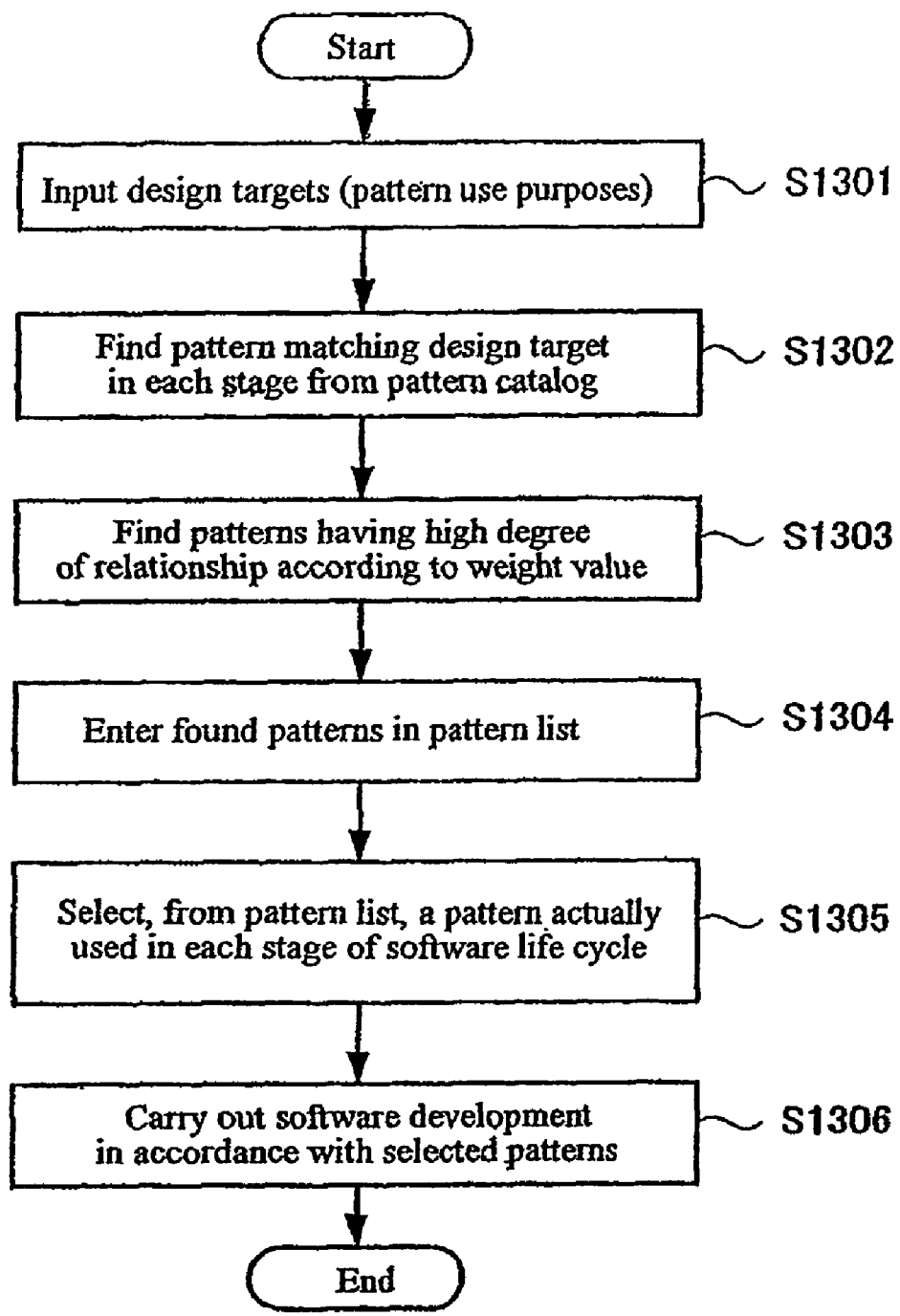
FIG. 13 is a flowchart for explaining the basic procedure of software development in the embodiment.

FIG. 13 is a flowchart for explaining the basic procedure of software development in this embodiment.

As shown in FIG. 13, a software developer, i.e., a user of the autonomic computing system, inputs a design target (pattern use purpose) with respect to each stage of the software life cycle and an importance value (step 1301). For example, keywords (e.g., "client", "server" and "independence") representing a design target "the independence of a client and a server" and an importance value of 0.5 are input with respect to the modeling stage; keywords (e.g., "existing", "classes" and "use") representing a design target "use of existing classes" and an importance value of 0.5 are input with respect to the development stage; keywords (e.g., "existing system" and "effective use") representing a design target "effective use of an existing system" and an importance value of 1.0 are input with respect to the operation stage. Design targets and importance values are thus input.

After input of the design target with respect to each stage, the pattern combination search engine 30 of the autonomic computing system finds the pattern matching the design target in each stage from the pattern catalog 20 (step 1302). Each of the pattern use purposes input as design targets with respect the stages is recorded in a text formed of a variable-length character string, as shown in FIGS. 4, 6, and 8. Use purposes closer with respect to details to each input design target text can be found in descending order of the degree of matching by using an existing text search technique. In such a case, several keywords, such as those shown above, representing the design target are designated as a search key and use purpose texts for the patterns stored in the pattern catalog 20 are searched to select in descending order of the degree of matching.

Subsequently, the pattern combination search engine 30 finds some of the patterns having high degrees of relationship in each stage according to the weight values of the combinations with the other patterns registered in the pattern catalog 20 (step 1303). The pattern combination search engine 30 then evaluates the found patterns by considering the weight values of the combinations with some of the patterns in the other stages found in step 1302 and the importance values of the design targets input in step 1301, and enters the patterns in the pattern list (step 1304).

These operations are, so to say, software development preprocessing. Operations in each stage of the software life cycle are performed according to the prepared pattern list.

After the start of software development, the pattern application agent 40 of the autonomic computing system selects the patterns to be actually used in the stages of the software life cycles from the pattern list prepared by the pattern combination search engine 30 (step 1305). More specifically, the combination having the largest sum of the weight values, i.e., having the highest degree of effectiveness, in the combinations of the patterns listed in the pattern list may be automatically selected as the patterns to be used. Alternatively, the pattern list may be presented to the software developer and the patterns selected by the software developer may be adopted as the patterns to be used.

Subsequently, the pattern application agent 40 controls the operation in the execution environments 11 to 14 in accordance with the patterns selected in step 1304 to be used in the stages of the software life cycle to carry out software development (step 1306).

In this embodiment, in addition to the above-described procedures, a preliminary prediction operation used in each stage and automatic solution operations used in the testing and operation stages are performed in implementation of automatic computing.

The preliminary prediction operation is a process in which, at the time of implementation of each stage of the software life cycle, simulation of patterns or a combination of the patterns used in a predetermined one of the subsequent stages are executed in advance if possible to find the most suitable pattern.

Figure 14:
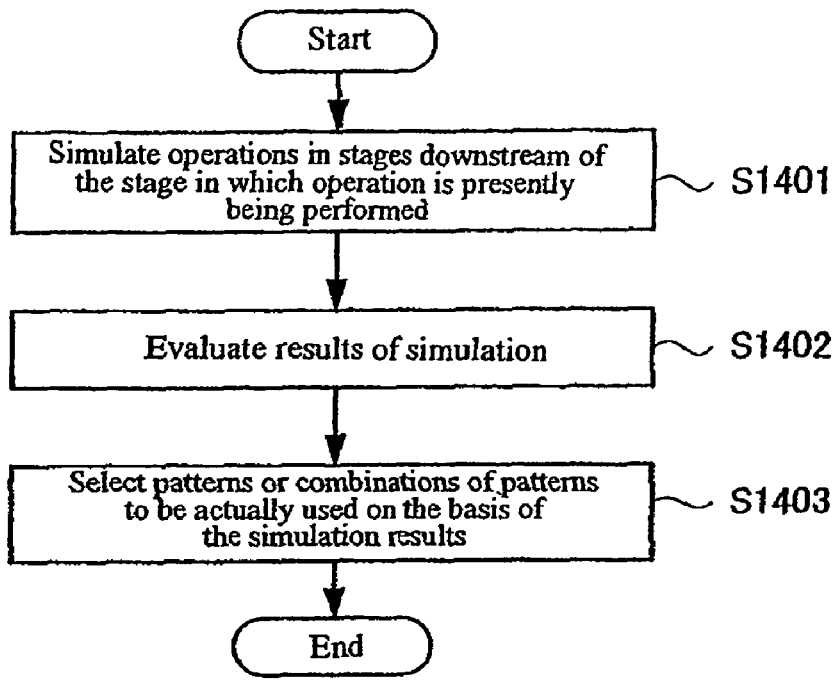
FIG. 14 is a flowchart for explaining the flow of a preliminary prediction operation in the embodiment.

FIG. 14 is a flowchart for explaining the flow of the preliminary prediction operation. This operation is introduced as an option added to the operation shown in step 1305 shown in FIG. 13.

The pattern application agent 40 simulates, with respect to a predetermined one of the stages of the software life cycle, operations in the stage and the subsequent stages in accordance with the patterns listed in the pattern list or a combination of the patterns (step 1401). This simulation is performed by using unused resources of the autonomic computing system. Thereafter, the pattern application agent 40 evaluates the functions and performance of the software with respect to each pattern or the combination of the patterns (step 1402), and selects the patterns or the combination of the patterns to be used in the actual execution environments 11 to 14 on the basis of the evaluation results (step 1403).

For example, by search of the patterns with respect to the development stage, a plurality of design patterns usable for the logical model for the software (the patterns for the modeling stage) are selected from the pattern catalog 20. It is supposed that the program structure of the software to be developed changes according to which design pattern is used, and that the performance of the software is also changed thereby. Therefore, it is effective to predict the most suitable pattern by actually generating a code to which the selected design pattern is applied and making a function test and a performance test on the generated code. The generation of a code and various tests can be automatically carried out, for example, by using tools in the execution environments 11 to 14 controlled by the pattern application agent 40.

By search of the patterns with respect to the operation stage, a physical placement pattern of a code, i.e., a topology pattern of hardware or software configuration is selected from the pattern catalog 20. It is effective to predict the most suitable placement pattern by executing a performance measurement With respect to the results of code placement based on the selected pattern. Code placement and performance measurement can be automatically carried out by using tools in the actual-operation environment 14 controlled by the pattern application agent 40.

The automatic solution operation is a process in which, if a bug or a performance problem is found in the developed software in implementation in the testing environment 13 or the actual-operation environment 14, the problem is solved or a report is made as a clue to a solution of the problem by going back to the stages upstream in the software life cycle and remaking the pattern selection in each stage as required.

Figure 15:
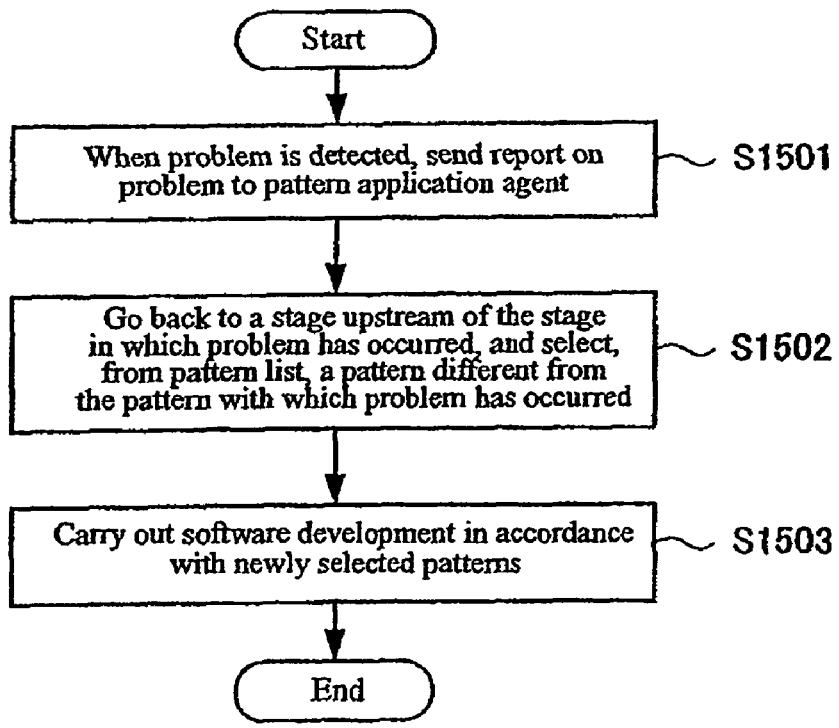
FIG. 15 is a flowchart for explaining the flow of an automatic solution operation in the embodiment.

FIG. 15 is a flowchart for explaining the flow of the automatic solution operation. This operation is executed when a problem occurs in the testing stage or the operation stage in carrying out software development in step 1306 shown in FIG. 13.

When a performance problem or the like is found in the testing stage or the operation stage of the software life cycle, a report for informing the pattern application agent 40 of the problem is made (step 1501). The pattern application agent 40 receives the report on the occurrence of the problem, then goes back to one of the stages upstream of the stage in which the problem has occurred, selects from the pattern list a pattern different from the pattern with which the problem has occurred (step 1502), and newly carries out software development from the upstream stage (step 1503).

Figure 16:
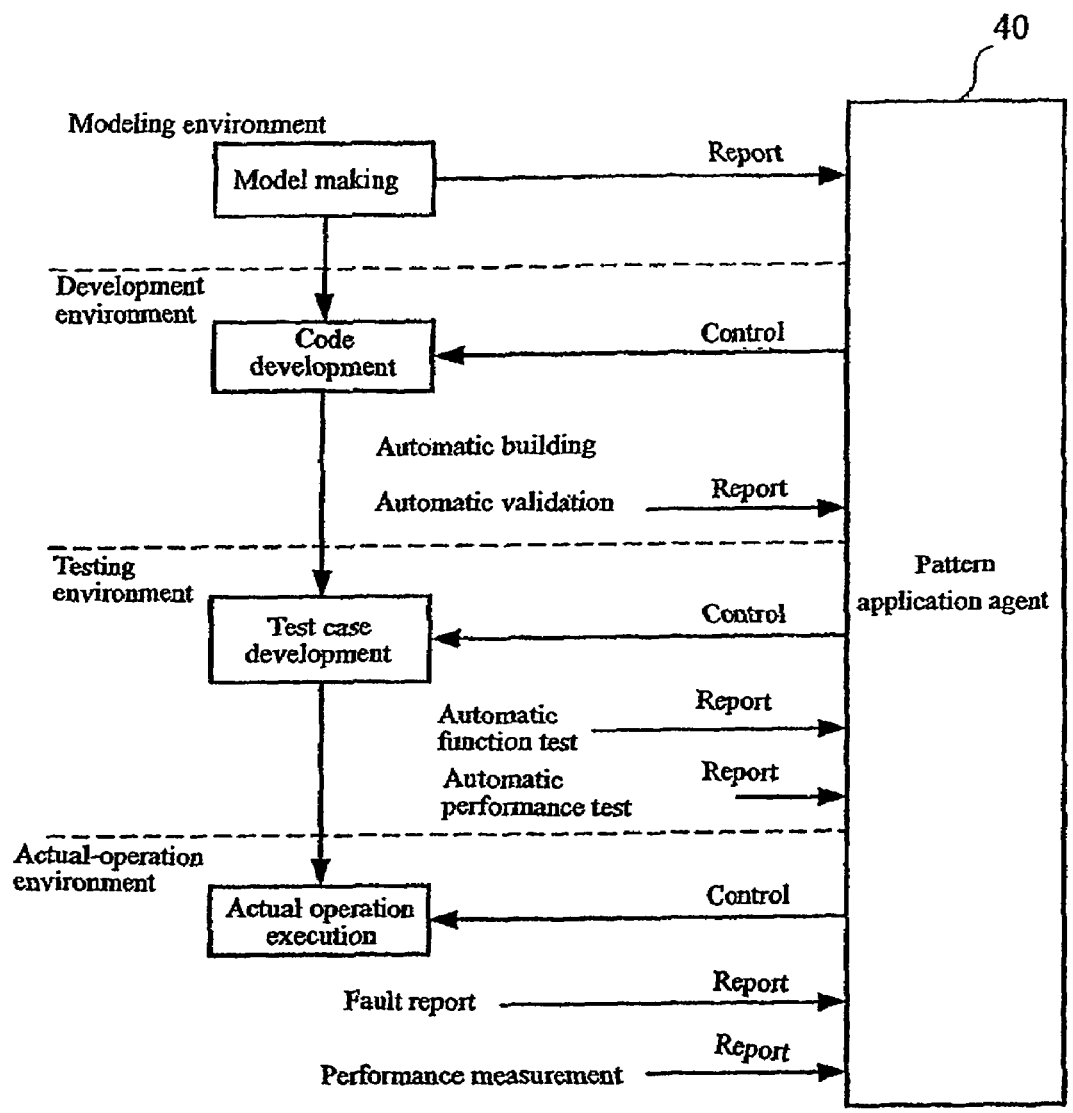
FIG. 16 is a diagram for explaining the relationship between the flow in the entire software life cycle and the automatic solution operation based on autonomic computing in the embodiment.

FIG. 16 is a diagram for explaining the relationship between the flow in the entire software life cycle and the automatic solution operation based on autonomic computing in this embodiment.

As shown in FIG. 16, a function test and a performance test are carried out by using tools in the testing stage. If a problem is thereby found, a notice of finding of the problem is sent from the testing environment 13 to the pattern application agent 40. In a case where a problem occurs in actual use of the software in the operation stage or a problem is found by a performance measurement, a notice of occurrence of the problem is sent from the actual-operation environment 14 to the pattern application agent 40. The pattern application agent 40 receives this notice from the testing environment 13 or the actual-operation environment 14, reads out the pattern list stored in the storage device, and selects, on the basis of the pattern list, a pattern different from the pattern with which the problem has occurred. The pattern application agent 40 controls the execution environments 11 to 14 from one of the stages upstream of the stage in which the problem has occurred, and again executes the operation in each stage. If a plurality of combinations of patterns is listed in the pattern list and if the weight values and evaluation values of the combinations are shown in the list, the combination having the next smaller values than those of the combination with which the problem has occurred can be selected. Also, the arrangement may be such that image data for display of the pattern list is generated, the pattern list is displayed on a display through the video card 104 shown in FIG. 2 to be presented to the user of the system (software developer), and an operation performed by the user to designated the desired combination by means of an input means such as a keyboard is accepted to adopt the selected combination. Further, the pattern list may be again formed by the pattern combination search engine 30 after making a condition setting to inhibit entry of the pattern with which the problem has occurred.

The process may be again performed from application of a pattern by going back to the modeling stage in a case where a problem is found at the time of code implementation (automatic building) or verification (automatic validation) in the development stage, as well as in a case where a problem is found in the testing stage or the operation stage.

For example, when the pattern application agent 40 is notified of occurrence of a problem in the testing stage or the operation stage, a code for bug analysis for identifying a software bug which is the cause of the problem is embedded in the software to be developed, by going hack to the upstream development stage. Embedding of a bug analysis code can be performed by controlling an automatic code generating tool of development environment 12 as with embedding of other codes. In this case, problem identification patterns in which bug analysis codes usable to identify any problem are formed and registered in the pattern catalog 20 in advance, and some of the patterns matching a phenomenon are selected by the pattern combination search engine 30 to form a pattern list.

In a case where a bug analysis code is embedded as a counter to occurrence of a problem in the testing stage, the same problem occurs when the software in which this bug analysis code is embedded is again tested in the testing stage. However, analysis data in which the kind of the problem and the portion of the software in which the cause of the problem exists are recorded is automatically formed by the function of the bug analysis code and is accumulated in a storage device in the testing environment 13 (or sent from the testing environment 13 to the pattern application agent 40 via a network to be stored in a storage device, e.g., the magnetic disk unit 105 shown in FIG. 2).

In a case where a bug analysis code is embedded as a counter to occurrence of a problem in the operation stage, the software in which this bug analysis code is embedded is executed for completion of the task in the operation stage. When the same problem again occurs, analysis data in which the kind of the problem and the portion of the software in which the cause of the problem exists are recorded is automatically formed by the function of the bug analysis code and is accumulated in a storage device in the actual-operation environment 14 (or sent from the actual-operation environment 14 to the pattern application agent 40 via a network to be stored in a storage device, e.g., the magnetic disk unit 105 shown in FIG. 2).

In a case where the pattern application agent 40 is notified of a performance problem in the testing stage or the operation stage, the process returns to the upstream development stage and a device for performance analysis (a measurement environment) is incorporated in the software to be developed. This can be achieved, for example, by embedding a code for performance measurement in the software to be developed. Embedding of a performance measurement code can be performed by controlling the automatic code generating tool in the development environment 12 as well as embedding of other codes. In this case, problem identification patterns in which a description is made as to which performance analysis method can be suitably used are formed and registered in the pattern catalog 20 in advance to enable preparation of a pattern list by the pattern combination search engine 30.

When the software in which the performance measurement code is embedded is again subjected to the performance test in the testing stage, the performance analysis of the software is executed by the function of the performance measurement code to determine which portion of the software is low in performance (requiring a considerably long execution time, or causing a delay, for example) and to automatically form analysis data in which the analysis results are recorded. The analysis data is accumulated in a storage device in the testing environment 13 (or sent from the testing environment 13 to the pattern application agent 40 via a network to be stored in a storage device, e.g., the magnetic disk unit 105 shown in FIG. 2).

In a case where a portion with a problem relates to pattern selection in the development stage, each of the plurality of patterns entered in the pattern list may be used to execute the performance test to again select the most suitable pattern. The operations after the development stage are then carried out.

As described above, the autonomic computing system in this embodiment controls the operations in the execution environments 11 to 14 while autonomically adapting itself to each stage of the software life cycle to contribute to an improvement in software development efficiency.

Also, in each stage of the software life cycle, a simulation of the subsequent stages is performed to predict occurrence of a problem in order to select a design pattern to be used, and the design pattern to be used is changed by going back to the development stage or the modeling stage when a problem occurs actually in the testing stage or the operation stage, thereby achieving autonomic adaptation.

The invention claimed is:

1. An execution environment control method of controlling the operation of an execution environment in each of stages of a software life cycle including a modeling stage, a development stage, a testing stage and an operation stage by using a computer, said method comprising:

a step in which the computer searches a pattern catalog which is constructed in storage means and in which information on patterns of design applicable in respective the stages of the software life cycle is stored to find a pattern applied to each of the stages of the software life cycle; and a step in which the computer applies the pattern found by searching to each of the stages of the software life cycle, and controls the operation in the execution environment in the stage.

2. The execution environment control method according to claim 1, wherein said step of controlling the operations in the execution environments includes:

a step of performing, with respect to the pattern applicable to a predetermined one of the stages of the software life cycle, a simulation of operations in the stages subsequent to the predetermined one of the stages, and a step of determining the pattern to be applied to the predetermined one of the stages on the basis of the results of the simulation.

3. The execution environment control method according to claim 1, wherein said step of controlling the operations in the execution environments includes returning to a preceding one of the stages of the software life cycle before a predetermined one of the stages when a problem is found in the processed software in the predetermined one of the stages, then newly applying another of the patterns different from the pattern that has been applied to the preceding stage, and controlling the operation in the execution environments in the stages subsequent to the preceding stage.

4. The execution environment control method according to claim 1, wherein said step of searching the patterns includes searching for the pattern to be applied to execution means of executing the operations in each stage of the software life cycle on the basis of information on the design patterns applicable to each stage and information on the degree of relationship in combinations of the patterns, said information being stored in said pattern catalog.

* * * * *